(12) United States Patent
Wyse et al.

(10) Patent No.: US 9,673,877 B1
(45) Date of Patent: Jun. 6, 2017

(54) RADIOFREQUENCY PROCESSOR

(71) Applicant: Rockwell Collins, Inc., Cedar Rapids, IA (US)

(72) Inventors: Russell D. Wyse, Center Point, IA (US); Michael L. Hageman, Mount Vernon, IA (US); Theodore J. Hoffmann, Palo, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/147,477

(22) Filed: May 5, 2016

(51) Int. Cl.
  *H04B 7/04* (2017.01)
  *H04B 7/0413* (2017.01)
  *H04L 27/26* (2006.01)

(52) U.S. Cl.
  CPC ....... *H04B 7/0413* (2013.01); *H04L 27/2601* (2013.01)

(58) Field of Classification Search
  USPC .......................................................... 375/316
  See application file for complete search history.

(56) References Cited

U.S. PATENT DOCUMENTS

| 8,660,514 | B1 | 2/2014 | Wyse | |
| 8,963,612 | B1* | 2/2015 | Wyse | H03D 7/1491 |
| | | | | 327/355 |
| 9,059,662 | B1* | 6/2015 | Wyse | H03D 7/1433 |
| 2013/0114468 | A1* | 5/2013 | Hui | H01Q 3/2611 |
| | | | | 370/277 |
| 2014/0269310 | A1* | 9/2014 | Hoffmann | H04W 28/021 |
| | | | | 370/235 |
| 2016/0294532 | A1* | 10/2016 | Masmoudi | H04B 15/005 |

* cited by examiner

*Primary Examiner* — Kevin M Burd
(74) *Attorney, Agent, or Firm* — Angel N. Gerdzhikov; Donna P. Suchy; Daniel M. Barbieri

(57) ABSTRACT

A multiple input, multiple function, multiple output (MIMFMO) radiofrequency (RF) processor including a MIMFMO RF processor element. The MIMFMO RF processor element is configured to receive multiple RF input signals, perform multiple RF operations on the multiple RF input signals, and output processed RF output signals to multiple output circuits.

15 Claims, 9 Drawing Sheets

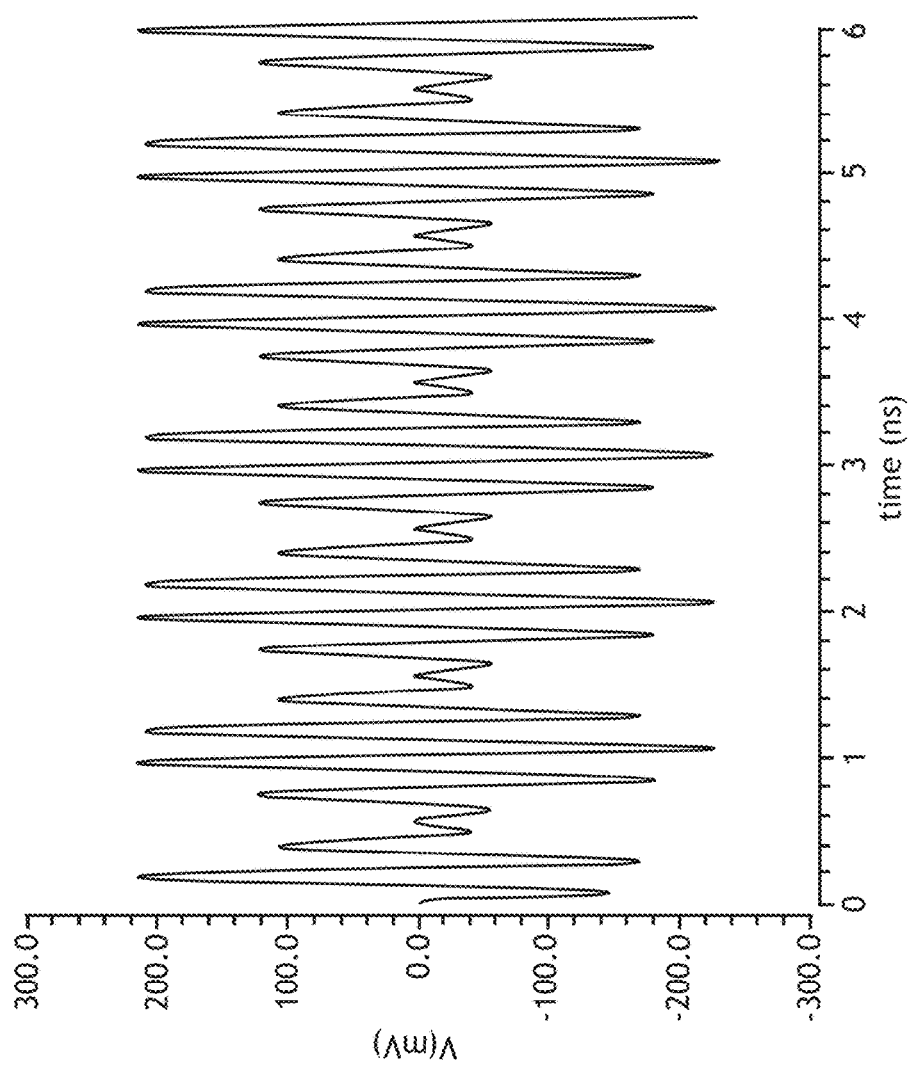

RADIOFREQUENCY PROCESSOR

CROSS-REFERENCE TO RELATED APPLICATIONS

The present application is related to U.S. patent application Ser. No. 14/030,411, filed on Sep. 18, 2013, which issued as U.S. Pat. No. 8,963,612 on Feb. 24, 2015, to U.S. patent application Ser. No. 14/224,867, filed on Mar. 25, 2014, which issued as U.S. Pat. No. 9,059,662 on Jun. 16, 2015, and to U.S. patent application Ser. No. 13/438,524, filed on Apr. 3, 2012, which issued as U.S. Pat. No. 8,660,514 on Feb. 25, 2014, all of which are hereby expressly incorporated herein in their entirety.

BACKGROUND

Radiofrequency (RF) communications equipment generally employs a combination of mixers, amplifiers and switches to route signals through alternate paths for filtering or processing. Amplifiers are useful to increase the power level of a signal of interest. In RF transmission, RF mixers are used to transpose radio frequencies to a useful signal for transmission and delivery at an intermediate frequency. Conversely, in reception, mixers are used to transpose the RF frequency of a received signal to a relatively low intermediate frequency for processing by downstream electronic circuits.

Existing RF systems lack reconfigurable system architectures that may be suitable for extended frequency coverage and simultaneous transmit and receive (STAR) operation.

SUMMARY

In one aspect, embodiments of the inventive concepts disclosed herein are directed to a multiple input, multiple function, multiple output (MIMFMO) radiofrequency (RF) processor including a MIMFMO RF processor element. The MIMFMO RF processor element may be configured to receive multiple RF input signals, perform multiple RF operations on the multiple RF input signals, and output processed RF output signals to multiple output circuits.

In a further aspect, embodiments of the inventive concepts disclosed herein are directed to a system including multiple input circuits, multiple output circuits, and a multiple input, multiple function, multiple output (MIMFMO) radiofrequency (RF) processor. The MIMFMO RF processor is coupled to the input circuits and the output circuits. The MIMFMO RF processor includes a MIMFMO RF processor element configured to receive multiple RF input signals, perform multiple RF operations on the multiple RF input signals, and output processed RF output signals to multiple output circuits.

In a further aspect, embodiments of the inventive concepts disclosed herein are directed to method for operating a multiple input, multiple function, multiple output (MIMFMO) radiofrequency (RF) processor. The method may include receiving an instruction to program a MIMFMO RF processor including one or more MIMFMO RF processor elements configured to receive multiple RF input signals, to perform multiple RF operations, and to output processed RF output signals to multiple output circuits. The instruction indicates at least one designated MIMFMO RF processor element of the one or more MIMFMO RF processor elements, at least one designated input circuit corresponding to at least one particular RF input signal, at least one designated RF operation, and at least one designated output circuit corresponding to at least one processed RF output signal. The method may also include, upon receipt of the instruction, programming the MIMFMO RF processor such that a particular designated MIMFMO RF processor element of the at least one designated MIMFMO RF processor element utilizes the at least one designated RF input signal to perform the at least one designated RF operation to output the at least one processed RF output signal to the at least one designated output circuit.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 5B shows a time domain graph of a waveform of the same RF processor channel's output signal depicted in FIG. 5A as a plot of voltage against time without active cancellation of the interfering 4 GHz signal.

DETAILED DESCRIPTION

Figure 1:
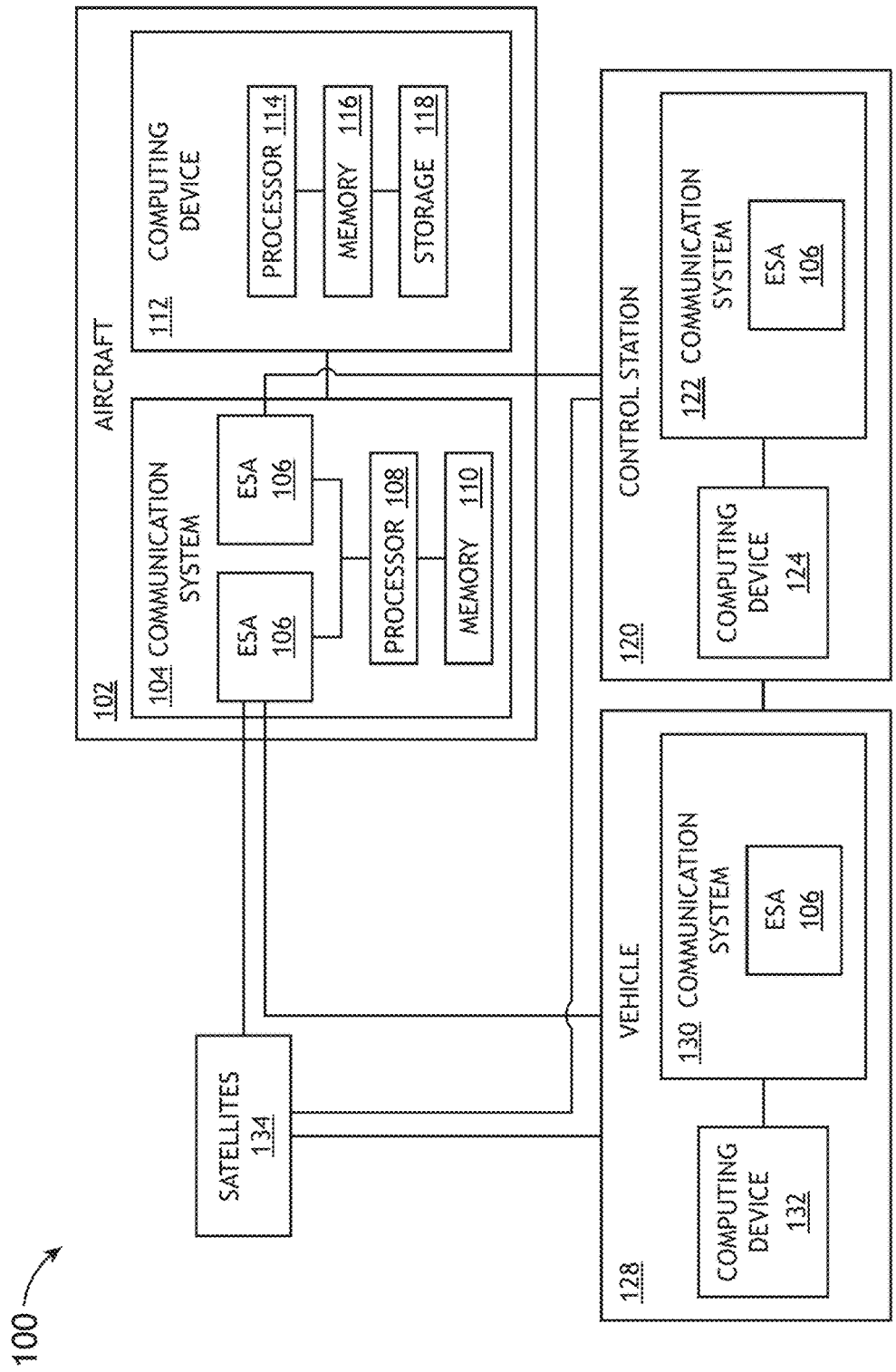
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a multiple input, multiple function, multiple output (MIMFMO) RF processor. The MIMFMO RF processor may include one or a plurality (e.g., an array) of MIMFMO RF processor elements. In exemplary embodiments, the MIMFMO RF processor may be configured (e.g., reconfigured, programmed as a special purpose processor, or reprogrammed as a special purpose processor) for any suitable frequency coverage and for any suitable RF system by, for example, receiving instructions at a programming interface (e.g., a serial peripheral interface (SPI) or a digital interface) from any suitable communicatively coupled computing device. That is, the MIMFMO RF processor may be a reconfigurable MIMFMO RF processor. In exemplary embodiments, the MIMFMO RF processor provides system flexibility allowing for flexibility in the design of RF systems and the ability to use a single type of RF processor for multiple radio architectures and for various frequency coverages. For example, the MIMFMO RF processor may be programmed as a special purpose processor that optimizes performance of a specific RF system. Additionally, reprogrammability of the MIMFMO RF processor improves the functioning of the processor, itself, by allowing the MIMFMO RF processor to be utilized in a wider array of applications, environments, and radio architectures. In some embodiments, the MIMFMO RF processor is configured for STAR. Exemplary embodiments may reduce size, weight, power, and cost, which, for example, are desirable for systems implemented in aircraft.

Some embodiments may be implemented in active electronically scanned array (ESA) (AESA)-based multi-function weather radar systems (e.g., next-generation commercial AESA-based multi-function weather radar systems). Some embodiments may be implemented in radar systems, such as radar systems for maritime surveillance, unmanned aerial system (UAS) detect and avoid, maritime rotary wing search and rescue, degraded visual environment (DVE) imaging, synthetic aperture radar (SAR), inverse synthetic aperture radar (ISAR), and frequency modulated continuous wave radar (FMCW radar). Some embodiments may be implemented in high data rate directional data link systems, such as for man packs, ground vehicles, maritime use, airborne use, satellite communications on the move (SOTM), or special operations. Some embodiments may be implemented in electronic attack systems, such as ultra-wide band (UWB) electronic attack (EA) jammers. Some embodiments may improve functionality of communication systems in electronically jammed environments by cancelling out EA jammers' signals. Some embodiments may be implemented in anti-access area denial (A2AD) burn through jammer AESAs. Some embodiments may be implemented in any of suitable bandwidth AESA applications, such as narrow bandwidth, mid bandwidth, or wider bandwidth AESA applications (e.g., ultra-wide band radar applications).

Referring now to FIG. 1, an exemplary embodiment of a system 100 according to the inventive concepts disclosed herein includes at least one aircraft 102, a control station 120, at least one vehicle 128, and satellites 134. Some or all of the aircraft 102, the control station 120, the vehicle 128, and the satellites 134 may be communicatively coupled at any given time.

The aircraft 102 includes at least one communication system 104 and at least one computing device 112 (which may also be referred to as at least one aircraft computing device), as well as other systems, equipment, and devices commonly included in aircraft. Some or all of the communication system 104, the computing device 112, and other systems, equipment, and devices commonly included in aircraft may be communicatively coupled.

The communication system 104 includes one or more antennas (e.g., two electronically scanned arrays (ESAs) 106, as shown), a processor 108, and memory 110, which are communicatively coupled. The communication system 104 (such as via one or more of the ESAs 106) is configured to send and/or receive signals, data, messages, and/or voice transmissions to and/or from the control station 120, the vehicle 128, the satellites 134, and combinations thereof, as well as any other suitable devices, equipment, or systems. That is, the communication system 104 is configured to exchange (e.g., bi-directionally exchange) signals, data, messages, and/or voice communications with any other suitable communication system.

The communication system 104 may include at least one processor 108 configured to run various software applications or computer code stored in a non-transitory computer-readable medium (e.g., memory 110) and configured to execute various instructions or operations. For example, the processor 108 may be configured to receive data from the computing device 112 and execute instructions configured to cause a particular ESA of the ESAs 106 to transmit the data as a signal(s) to another communication system (e.g., 122 or 130) of the system 100. Likewise, for example, the processor 108 may be configured to route data received as a signal(s) by a particular ESA of the ESAs 106 to the computing device 112. One or more of the ESAs 106 may be implemented as one or more AESAs.

Figure 2:
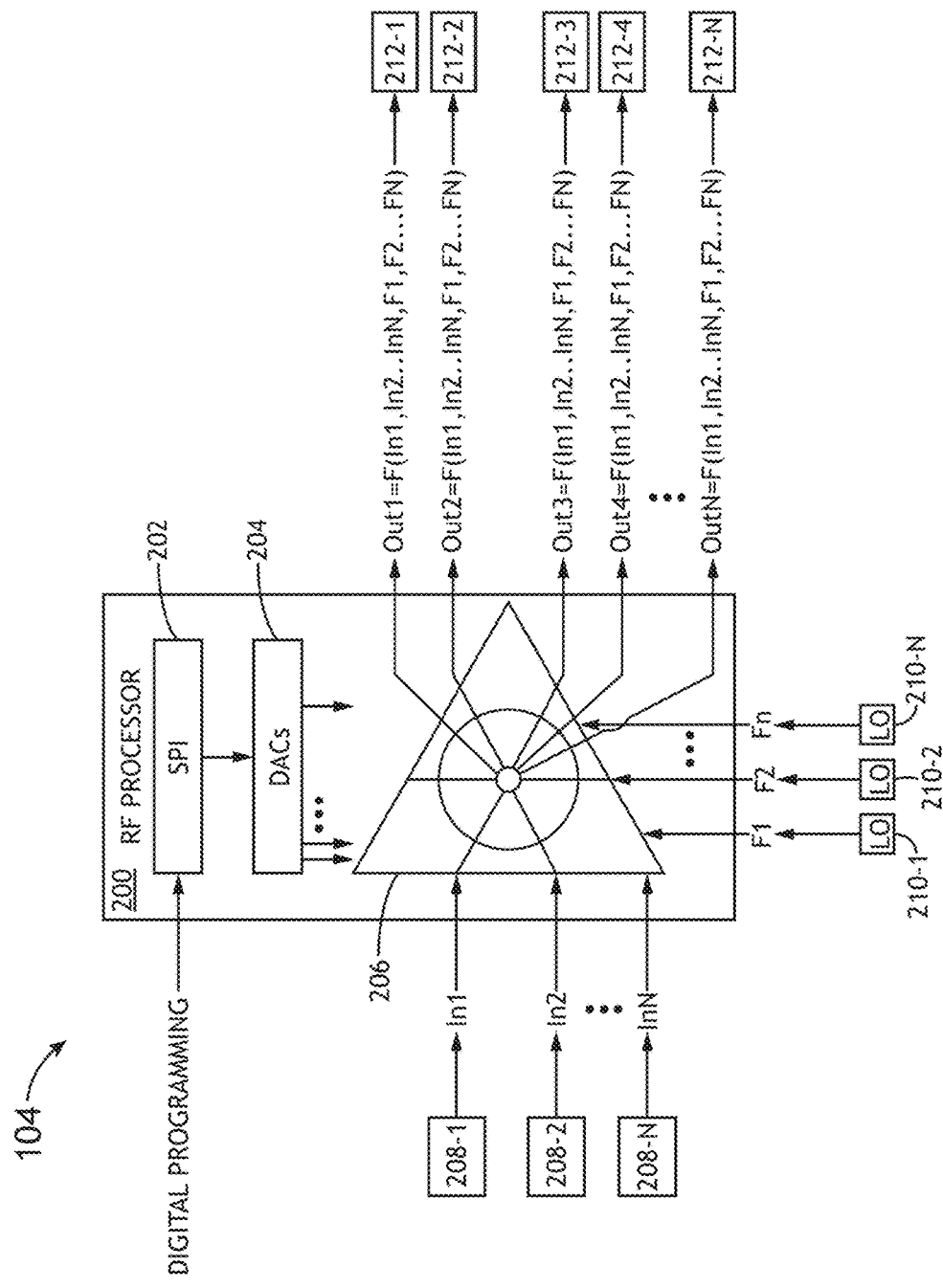
FIG. 2 is a view of an exemplary embodiment of a communication system of FIG. 1 including an RF processor according to the inventive concepts disclosed herein.
Figure 3:
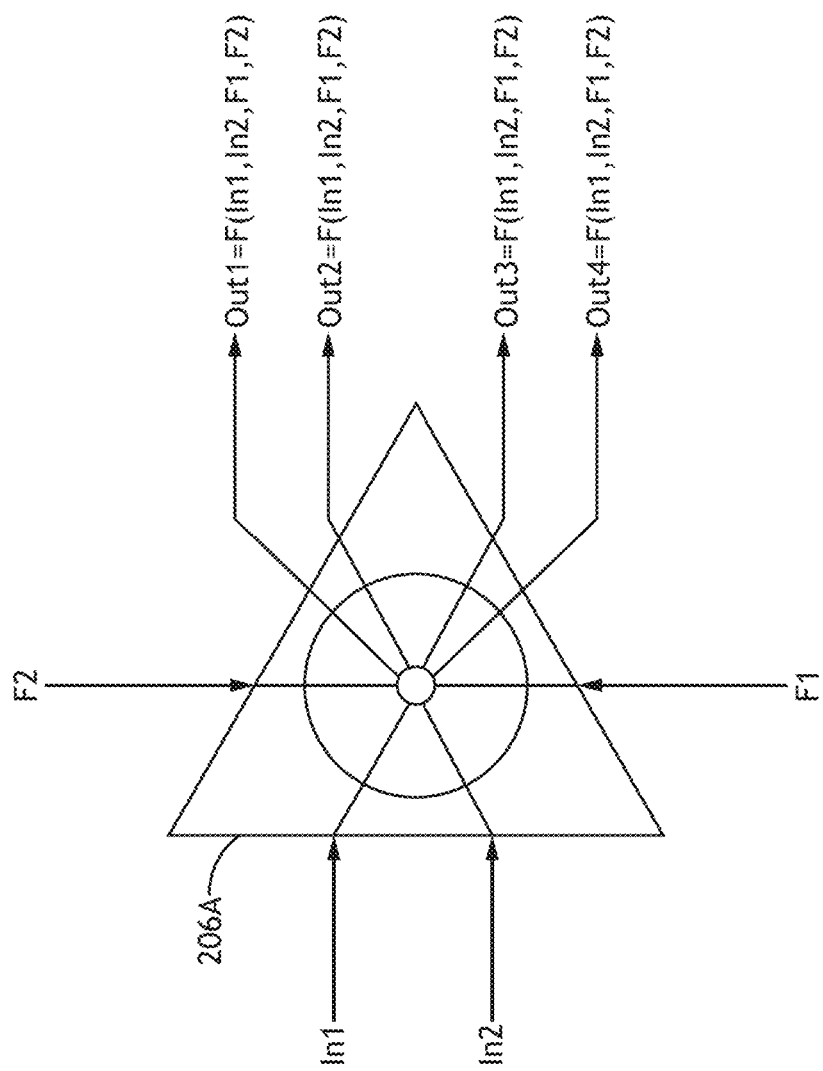
FIG. 3 is a view of an RF processor element of an exemplary embodiment according to the inventive concepts disclosed herein.
Figure 4:
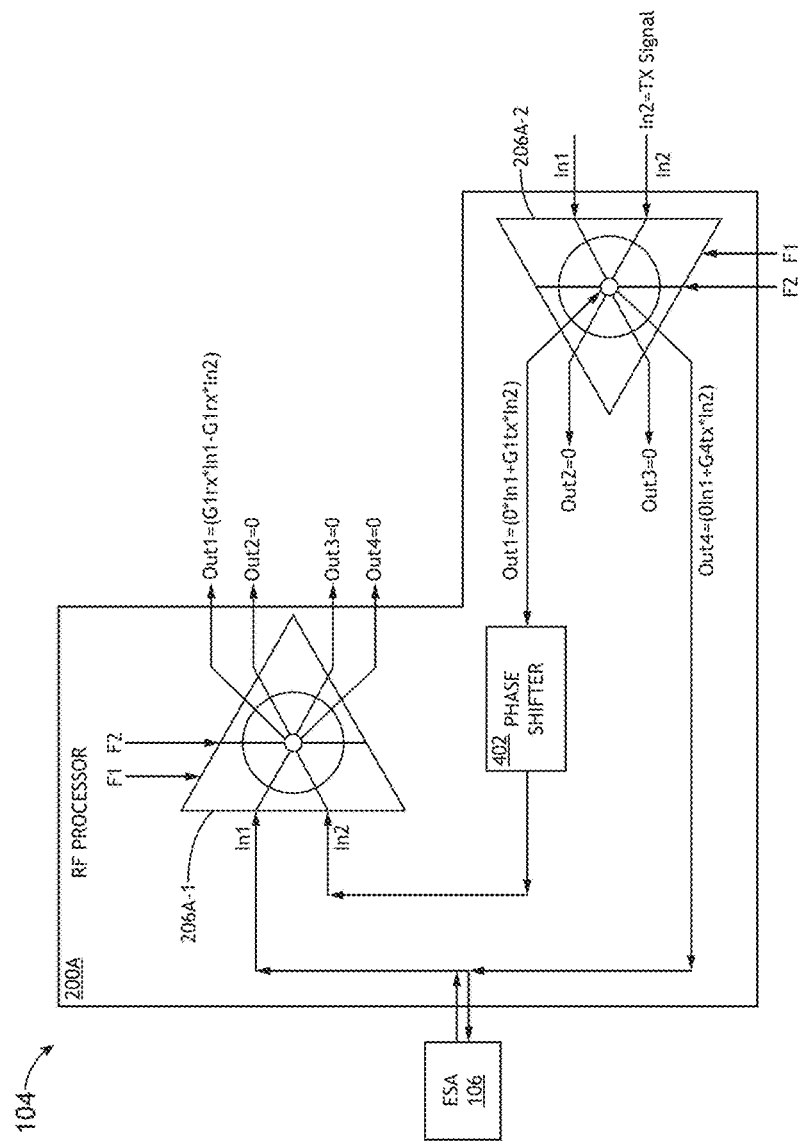
FIG. 4 is a view of an exemplary embodiment of a communication system 104 of FIG. 1 including an RF processor according to the inventive concepts disclosed herein.

In some embodiments, the processor 108 may be implemented as one or more RF processors (e.g., RF processor 200 and/or RF processor 200A, as illustrated and described with respect to FIGS. 2 and 4), such as one or more MIMFMO RF processors. Additionally, the processor 108 may be implemented as or include one or more RF processor elements (e.g., RF processor element 206 and/or RF processor element 206A, as illustrated and described with respect to FIGS. 2-4), such as one or more MIMFMO RF processor elements.

While the communication system 104 is shown as having two ESAs 106, one processor 108, and memory 110, the communication system 104 may include any suitable number of ESAs 106, processors 108, and memory 110. Additionally, while the communication system 104 is shown as including the ESAs 106, the communication system 104 may include or be implemented with any suitable antenna(s) or antenna device(s). Further, the communication system 104 may include other components, such as a storage device (e.g., solid state drive or hard disk drive), radios (e.g., software defined radios (SDRs)), transmitters, receivers, transceivers, radio tuners, and controllers.

The computing device 112 of the aircraft 102 may include at least one processor 114, memory 116, and storage 118, as well as other components, equipment, and/or devices commonly included in a computing device, all of which may be communicatively coupled to one another. The computing device 112 may be configured to route data to the communication system 104 for transmission to an off-board destination (e.g., satellites 134, vehicle 128, control station 120). Likewise, the computing device 112 may be configured to receive data from the communication system 104 transmitted from off-board sources (e.g., satellites 134, vehicle 128, control station 120). The computing device 112 may include or be implemented as and/or be configured to perform the functionality of any suitable aircraft system, such as a flight management system. The processor 114 may be configured to run various software applications or computer code stored in a non-transitory computer-readable medium (e.g., memory 116 or storage 118) and configured to execute various instructions or operations. In some embodiments, the aircraft 102 may include any suitable number of computing devices 112.

The control station 120 includes at least one communication system 122 and at least one computing device 124, as well as other systems, equipment, and devices commonly included in a control station. Some or all of the communication system 122, the computing device 124, and other systems, equipment, and devices commonly included in a control system may be communicatively coupled. In one embodiment, the control station 120 may be implemented as a fixed location ground control station (e.g., a ground control station of an air traffic control tower, or a ground control station of a network operations center) or a mobile ground control station (e.g., a ground control station implemented on a non-airborne vehicle (e.g., an automobile or a ship) or a trailer). In some embodiments, the control station 120 is implemented as an air control station implemented on an airborne vehicle (e.g., aircraft).

The communication system 122 and components thereof (such as ESA 106) of the control station 120 may be implemented similarly to the communication system 104 except that, in some embodiments, the communication system 122 may be configured for operation at a fixed location. The computing device 124 and components thereof (such as a processor (not shown) and memory (not shown)) of the control station 120 may be implemented similarly to the computing device 112.

The vehicle 128 includes at least one communication system 130 and at least one computing device 132, as well as other systems, equipment, and devices commonly included in a vehicle. Some or all of the communication system 130, the computing device 132, and other systems, equipment, and devices commonly included in a vehicle may be communicatively coupled. The vehicle 128 may be implemented as any suitable type of vehicle, such as an automobile, aircraft, spacecraft, train, watercraft, or submersible craft. The communication system 130 and components thereof (such as ESA 106) of the vehicle 128 may be implemented similarly to the communication system 104 and the communication system 122. The computing device 132 and components thereof (such as a processor (not shown) and memory (not shown)) of the vehicle 128 may be implemented similarly to the computing device 112.

While the ESAs 106 are exemplarily depicted as being implemented in the aircraft 102, the control station 120, and the vehicle 128, in some embodiments, ESAs 106 may be implemented in, on, or coupled to any other suitable device, equipment, or system, such as a computing device (e.g., a laptop computing device, a mobile computing, a wearable computing device, or a smart phone), a mobile communication system (e.g., a man pack communication system), or satellites 134.

Additionally, while the system 100 is shown as including the ESAs 106, the system 100 may include or be implemented with any suitable antenna(s) or antenna device(s).

Referring now to FIG. 2, an exemplary embodiment of a communication system 104 including an RF processor 200 according to the inventive concepts disclosed herein is shown. The communication system 104 may be implemented and function similarly to the communication system 104 of FIG. 1 except that RF processor 200 may be substituted for the processor 108 of FIG. 1 or that the communication system 104 may further include the RF processor 200 in addition to the processor 108. The communication system 104 exemplarily includes one or more input circuits 208-1, 208-2, . . . 208-N (which may collectively be referred to as input circuits 208), the RF processor 200, one or more local oscillators (LO) 210-1, 210-2, . . . 210-N (which may collectively be referred to as local oscillators 210), and one or more output circuits 212-1, 212-2, . . . 212-N (which may collectively be referred to as output circuits 212), some or all of which may be communicatively coupled to one another. While FIG. 2 does not show all of the components that might be implemented within the communication system 104, embodiments may include any suitable components, such as any suitable components utilized for receiving, processing, and/or transmitting signals.

The RF processor 200 may be implemented as an integrated circuit. The integrated circuit may comprise one or more substrates including a plurality of transistors. For example, a substrate may comprise a silicon (Si) substrate, silicon germanium (SiGe) substrate, gallium-arsenide (GaAs) substrate, Indium phosphide (InP) substrate, or gallium-nitride (GaN) on a silicon substrate. For example, the plurality of transistors may include any of various suitable types of transistors, such as bipolar terminal transistors (BJTs), metallic oxide semiconductors (MOSs), complementary metallic oxide semiconductors (CMOSs), bipolar CMOSs (Bi-CMOSs), heterojunction bipolar transistors (HBTs), field-effect transistors (FET), metal semiconductor field effect transistors (MES-FETs), high-electron-mobility transistors (HEMTs), piezoelectric transistors (PETs), and/or silicon (Si) junction gate field-effect transistors (JFETs).

Each of the input circuits 208 may be configured to provide input signals to the RF processor element 206. Each of the input circuits 208 may be implemented in, on, or as a portion of any suitable electronic device, such as an antenna device (e.g., one of the ESAs 106), the processor 108, the memory 110, or a component (e.g., another RF processor element or one of the LOs 210) of the RF processor 200. Further, the input circuits 208 may be circuitry coupled to any suitable communicatively coupled electronic device, such as the computing device 112 or components thereof. Such suitable electronic devices are configured to output signals, via one or more of the input circuits 208, to be received as inputs by the RF processor 200. For example, each of the input circuits 208 may be implemented in or as a separate antenna device (e.g., ESA 106), which is distinct from other antenna devices (e.g., other ESAs) that may include other input circuits. Additionally, in some embodiments, one or more of the input circuits 208 may be configured to provide a plurality of RF inputs signals.

Each of the LOs 210 is an electronic oscillator configured to provide an LO frequency (e.g., F1, F2, . . . or Fn) to the RF processor element 206. The frequency of the LO signal provided to the RF processor element 206 may be utilized by the RF processor 200 to perform a mixer function (e.g., RF addition, RF subtraction, or RF translation) to change the frequency of a received signal to a processed signal having a different frequency. The LOs 210 may be implemented in, on, or as a portion of any suitable electronic device, such as an antenna device (e.g., one of the ESAs 106), the processor 108, the memory 110, the RF processor 200, and/or the computing device 112.

Each of the output circuits 212 may be configured to receive processed output signals from the RF processor element 206. Each of the output circuits 212 may be implemented in, on, or as a portion of any suitable electronic device, such as an antenna device (e.g., one of the ESAs 106), the processor 108, the memory 110, or a component (e.g., another RF processor element) of the RF processor 200. Further, the output circuits 212 may be circuitry coupled to any suitable communicatively coupled electronic device, such as the computing device 112 or components thereof. Such suitable electronic devices are configured to receive signals, via one or more of the output circuits 212, outputted by the RF processor 200. For example, each of the output circuits 212 may be implemented in or as a separate antenna device (e.g., ESA 106), which is distinct from other antenna devices (e.g., other ESAs) that may include other output circuits. Additionally, in some embodiments, one or more of the output circuits 212 may be configured to receive a plurality of processed RF output signals.

The RF processor 200 includes a programming interface (e.g., an SPI 202 or a digital interface), digital-to-analog converters (DACs) 204, and at least one RF processor element 206, which are communicatively coupled. The RF processor 200 is a MIMFMO RF processor, which may be reconfigurable. The RF processor 200 may be configured to run various software applications or computer code stored in a non-transitory computer-readable medium (e.g., memory 110) and configured to execute various instructions or operations.

The SPI 202 may be implemented as or include a shift register, such as a serial-in, parallel-out (SIPO) shift register. In exemplary embodiments, the RF processor 200 may be programmed or reprogrammed as a special purpose processor (e.g., a MIMFMO RF processor). For example, the computing device 112 (e.g., via the processor 114) may output serial digital instructions (e.g., serial digital programming) to the SPI 202 of the RF processor 200. The SPI 202 may receive the serial digital instructions and output a plurality of parallel digital signals to the DACs 204. Each of the DACs 204 are configured to convert a particular parallel digital signal to an analog signal and output the analog signal to the RF processor element 206. The analog signals from the DACs 204 are configured to control operation and output of the RF processor element 206. Receipt of the analog signals, from the DACs 204 and by the RF processor element 206, causes (e.g., programs) the RF processor element 206 to perform a designated RF operation (e.g., an RF mathematical operation, such as RF addition, RF subtraction, or RF translation) on input signals from one or more designated input circuits of the input circuits 208 and output processed signals to one or more designated output circuits of the output circuits 212. For example, digital programming from the computing device 112 may instruct and/or program the RF processor 200 (and/or the RF processor element 206) to utilize one or more particular input signals from one or more particular input circuits of the input circuits 208, utilize one or more particular LO frequencies, perform one or more particular RF operations on and/or by utilizing the one or more particular input signals and/or the one or more particular LO frequencies, and/or output one or more processed signals to one or more particular output circuits of the output circuits 212. That is, the digital instructions from the computing device 112 may include instructions for the RF processor element 206 as to which of the input circuits 208 to use, which (if any) of the LO frequencies to use, which of the RF operations to perform, and to which of the output circuits 212 to output processed signals.

Each RF processor element 206 is an MIMFMO RF processor element. For example, each RF processor element 206 may comprise a group of transistors implemented on the RF processor 200. The group of transistors may include any of various suitable types of transistors, such as bipolar terminal transistors (BJTs), metallic oxide semiconductors (MOSs), complementary metallic oxide semiconductors (CMOSs), bipolar CMOSs (Bi-CMOSs), heterojunction bipolar transistors (HBTs), field-effect transistors (FET), metal semiconductor field effect transistors (MES-FETs), high-electron-mobility transistors (HEMTs), piezoelectric transistors (PETs), and/or silicon (Si) junction gate field-effect transistors (JFETs).

Each RF processor element 206 is configured to receive multiple input signals, perform multiple RF operations (e.g., RF mathematical operations, such as RF addition, RF subtraction, and RF translation), and output multiple processed RF output signals. Upon the SPI 202 receiving digital programming, the SPI 202 may control the RF processor element 206 to simultaneously route (e.g., like a switch) one or more paths from the inputs through the RF processor element 206 such that the RF processor element 206 performs an RF operation.

At a given time, each RF processor element 206 may be programmed or reprogrammed to perform one or more designated RF operations on one or more designated RF input signals and output processed RF output signals to one or more designated output circuits. Each RF processor element 206 is configured to receive one or more of input signals from any one or combination of input circuits 208, receive a plurality of LO frequencies from any one or combination of LOs 210, perform any one or combination of a plurality of RF operations (e.g., RF mathematical operations, such as RF addition, RF subtraction, and RF translation), and output processed RF output signals to any one or combination of output circuits 212. For example, the RF processor element 206 may be programmed to receive and utilize one or more particular input signals from one or more particular input circuits of the input circuits 208, utilize one or more particular LO frequencies, perform one or more particular RF operations on and/or by utilizing the one or more particular input signals and/or the one or more particular LO frequencies, and/or output one or more processed signals to one or more particular output circuits of the output circuits 212. At a given time, the RF processor element 206 may be programmed to perform a designated RF operation(s) on a designated input signal(s) and/or designated LO frequencies and output a processed RF output signal(s) to a designated output circuit(s). Additionally, the RF processor element 206 may be reprogrammed for any desired set of designated RF operation(s), designated input signal(s) and/or designated LO frequencies, and designated output circuit(s).

For example, the RF processor element 206 is configured to control multiple RF inputs, blend the RF inputs, and output blended RF signals on multiple output paths by utilizing programmable broadband transfer functions.

The RF processor element 206 is configured to perform complex RF operations on multiple RF inputs and output multiple (e.g., same or different) processed RF output signals to multiple output circuits 212. Each processed RF output signal may be independent of other processed RF output signals. Each processed RF output signal may be formed by the RF processor element 206 performing a single RF operation on one or more RF inputs. Additionally, each processed RF output signal may be formed by the RF processor element 206 performing multiple RF operations on one or more RF inputs. Further, each processed RF output signal may be formed by the RF processor element 206 performing an RF operation on multiple RF inputs. Each processed RF output signal (e.g., Out1, Out2, Out3, Out4, or . . . OutN) may be a function of zero or more RF inputs (e.g., In1, In2, . . . and/or InN) and/or zero or more LO frequencies (e.g., F1, F2, . . . and/or Fn). Additionally, RF operations may be configured to control and/or change gain, phase, and/or frequency for a processed RF output signal.

While the RF processor element 206 is exemplarily shown as an N×N×N RF processor element with N inputs (i.e., from the input circuits 208), N LO frequency inputs (i.e., from the LOs 210), and N output paths (i.e., to the output circuits 212), the RF processor element 206 may have any number of inputs, any number of LO frequency inputs, and any number of output paths. For example, FIG. 3 depicts a 2×2×4 RF processor element 206A.

Referring now to FIG. 3, an RF processor element 206A of an exemplary embodiment according to the inventive concepts disclosed herein is shown. The RF processor element 206A may be implemented and function similarly to the RF processor element 206 of FIG. 2 except that the RF processor element 206A is a 2×2×4 RF processor element. The RF processor element 206A has two RF inputs (i.e., In1 and In2; e.g., from the input circuits 208), two LO frequency inputs (i.e., F1 and F2; e.g., from the LOs 210), and four RF output paths for transmitting processed RF output signals (i.e., Out1, Out2, Out3, Out4; e.g., to the output circuits 212).

The RF processor element 206A is configured to perform RF operations, such as RF addition, RF subtraction, and RF translation. The RF processor element 206A is configured to perform complex RF operations on multiple RF inputs and output multiple (e.g., same or different) processed RF output signals. Each processed RF output signal (e.g., Out1, Out2, Out3, or Out4) may be a function of zero or more RF inputs (e.g., In1 and/or In2) and/or zero or more LO frequencies (e.g., F1 and/or F2).

For example, the RF processor element 206A is configured to perform RF addition. Upon the SPI 202 receiving digital programming, the SPI 202 may control the RF processor element 206A to simultaneously route (e.g., like a switch) one or more paths from the inputs through the RF processor element 206A such that the RF processor element 206A performs an RF addition operation. Performing the RF addition operation may include superposing (e.g., superposition of) a first RF channel (e.g., associated with In1) and a second RF channel (e.g., associated with In2). The first RF channel and the second RF channel may have independent gains or equal gains.

The RF processor element 206A may be configured to perform the addition of In1 and In2 and output a processed RF output signal in any suitable manner.

As a first example of RF addition, the RF processor element 206A may be configured to output a processed RF output signal, Out1, to the output circuit 212-1 while switching the output paths for Out2-4 to be in isolation mode (e.g., switched off). Out1 is a superposition of the first RF channel and the second RF channel. The processed RF output signal, Out1, may be equal to (In1*(gain of In1)+In2*(gain of In2))*(gain of Out1). The output paths for Out2-4 may be in isolation mode such that no signal is transmitted from the RF processor element 206A to output circuits 212-2, 212-3, and 212-4.

As a second example of RF addition, the RF processor element 206A may be configured to output a processed RF output signal, Out2, to the output circuit 212-2 while switching the output paths for Out1 and Out3-4 to be in isolation mode. Out2 is a superposition of the first RF channel and the second RF channel. The processed RF output signal, Out2, may be equal to (In1*(gain of In1)+In2*(gain of In2))*(gain of Out2). The output paths for Out1 and Out3-4 may be in isolation mode such that no signal is transmitted from the RF processor element 206A to output circuits 212-1, 212-3, and 212-4.

As a third example of RF addition, the RF processor element 206A may be configured to output a first processed RF output signal, Out1, to the output circuit 212-1 and a second processed RF output signal, Out2, to the output circuit 212-2 while switching the output paths for Out3-4 to be in isolation mode. Each of Out1 and Out2 is a superposition of the first RF channel and the second RF channel. Out1 and Out2 may have independent gains. That is, the RF processor element 206A may be configured to simultaneously output two superposition signals, each with independent gains, of the two RF input signals In1 and In2 to two different output circuits 212-1 and 212-2. The processed RF output signal, Out1, may be equal to (In1*(gain of In1)+In2*(gain of In2))*(gain of Out1). The processed RF output signal, Out2, may be equal to (In1*(gain of In1)+In2*(gain of In2))*(gain of Out2). The output paths for Out3-4 may be in isolation mode such that no signal is transmitted from the RF processor element 206A to output circuits 212-3 and 212-4.

As a fourth example of RF addition, the RF processor element 206A may be configured to simultaneously route four superposition signals, each with equal gains, of the two RF input signals In1 and In2 to four different output circuits 212-1, 212-2, 212-3, 212-4. The RF processor element 206A may be configured to output a first processed RF output signal, Out1, to the output circuit 212-1, a second processed RF output signal, Out2, to the output circuit 212-2, a third processed RF output signal, Out3, to the output circuit 212-3, and a fourth processed RF output signal, Out4, to the output circuit 212-4. Each of Out1-4 may be an equivalent superposition signal, with equivalent gain, of the first RF channel and the second RF channel. The processed RF output signals, Out1-4, may be equal to (In1*(gain of In1)+In2*(gain of In2))*(gain of Out).

The RF processor element 206A may be configured to perform any suitable addition operations on any designated input signals (e.g., from any designated input circuits) according to any designated output path functions and to output processed addition RF output signals to any designated output circuits.

Additionally, for example, the RF processor element 206A is configured to perform RF subtraction. Upon the SPI 202 receiving digital programming, the SPI 202 may control the RF processor element 206A to simultaneously route (e.g., like a switch) one or more paths from the inputs through the RF processor element 206A such that the RF processor element 206A performs an RF subtraction operation. Performing the RF subtraction operation may include a subtraction of the first RF channel (e.g., associated with In1) and the second RF channel (e.g., associated with In2). The first and second RF channels may have independent gain and independent phase control.

By performing one or more RF subtraction operations, the RF processor element 206A may be configured to cancel out an undesired frequency(ies) from a received signal that includes RF interference. For example, the RF processor element 206A may be configured to cancel out an electronic attack (EA) jammer device's frequency from a received signal by subtracting the jammer's frequency from the received signal and outputting the processed subtraction signal to another device.

The RF processor element 206A may be configured to perform subtraction of In1 and In2 and output a processed RF output signal in any suitable manner.

As a first example of RF subtraction, the RF processor element 206A may be configured to output a processed RF output signal, Out1, to the output circuit 212-1 while switching the output paths for Out2-4 to be in isolation mode (e.g., switched off). Out1 is a subtraction of the second RF channel from the first RF channel. The processed RF output signal, Out1, may be equal to (In1*(gain of In1)–In2*(gain of In2))*(gain of Out1). The output paths for Out2-4 may be in isolation mode such that no signal is transmitted from the RF processor element 206A to output circuits 212-2, 212-3, and 212-4.

As a second example of RF subtraction, the RF processor element 206A may be configured to output a processed RF output signal, Out2, to the output circuit 212-2 while switching the output paths for Out1 and Out3-4 to be in isolation mode. Out2 is a subtraction of the first RF channel from the second RF channel. The processed RF output signal, Out2, may be equal to (–In1*(gain of In1)+In2*(gain of In2))*(gain of Out2). The output paths for Out1 and Out3-4 may be in isolation mode such that no signal is transmitted from the RF processor element 206A to output circuits 212-1, 212-3, and 212-4.

As a third example, the RF processor element 206A may be configured to simultaneously output (e.g., route) a first processed subtraction RF output signal, Out1, to the output circuit 212-1 and a second processed addition RF output signal, Out2, to the output circuit 212-2 while switching the output paths for Out3-4 to be in isolation mode. Out1 is a subtraction of the first RF channel from the second RF channel. Out2 is a superposition of the first RF channel and the second RF channel. That is, the RF processor element 206A may be configured to simultaneously output a superposition signal and subtraction signal of the two RF input signals In1 and In2 to two output circuits 212-1 and 212-2. The processed RF output signal, Out1, may be equal to (In1*(gain of In1)–In2*(gain of In2))*(–1)*(gain of Out1). The processed RF output signal, Out2, may be equal to (In1*(gain of In1)+In2*(gain of In2))*(gain of Out2). The output paths for Out3-4 may be in isolation mode such that no signal is transmitted from the RF processor element 206A to output circuits 212-3 and 212-4.

As a fourth example of RF subtraction, the RF processor element 206A may be configured to simultaneously route four subtraction signals, each with equal gains, of the two RF input signals In1 and In2 to four different output circuits 212-1, 212-2, 212-3, 212-4. The RF processor element 206A may be configured to output a first processed RF output signal, Out1, to the output circuit 212-1, a second processed RF output signal, Out2, to the output circuit 212-2, a third processed RF output signal, Out3, to the output circuit 212-3, and a fourth processed RF output signal, Out4, to the output circuit 212-4. Each of Out1-4 may be an equivalent subtraction signal, with equivalent gain, of the first RF channel and the second RF channel. The processed RF output signals, Out1-4, may be equal to (In1*(gain of In1)–In2*(gain of In2))*(gain of Out).

The RF processor element 206A may be configured to perform any suitable subtraction operations on any designated input signals (e.g., from any designated input circuits) according to any designated output path functions and to output processed subtraction RF output signals to any designated output circuits.

Further, for example, the RF processor element 206A is configured to perform RF translations (e.g., multiplication in the time domain). Upon the SPI 202 receiving digital programming, the SPI 202 may control the RF processor element 206A to simultaneously route (e.g., like a switch) one or more paths from the inputs through the RF processor element 206A such that the RF processor element 206A performs an RF translation operation. Performing the RF translation operation may include applying (e.g., multiplying in the time domain) an LO frequency to a mixed frequency signal (e.g., a superposition and/or subtraction of the first RF channel (e.g., associated with In1) and the second RF channel (e.g., associated with In2)) according to a particular programmed output path function. The first and second RF channels may have independent gain and independent phase control. Additionally, performing the RF translation operation may include a frequency translation of a single RF channel (e.g., associated with In1 or In2), for example, by applying an LO frequency to a single RF channel.

By performing one or more RF translation operations, the RF processor element 206A may be configured to convert an intermediate frequency (IF) signal to an RF signal for transmission by an antenna device (e.g., ESA 106 or a transmitter). Similarly, for example, by performing one or more RF translation operations, the RF processor element 206A may be configured to convert an RF signal (e.g., received by an antenna device (e.g., ESA 106 or a receiver)) to an IF signal, which may be used by electronic components of a communication system 104.

The RF processor element 206A may be configured to perform RF translation operations of In1 and/or In2 and output a processed RF output signal in any suitable manner.

As a first example of RF translation, the RF processor element 206A may be configured to output a processed RF output signal, Out1, to the output circuit 212-1 while switching the output paths for Out2-4 to be in isolation mode (e.g., switched off). Out1 is a translation of a mixed frequency signal (which is a subtraction of the second RF channel from the first RF channel) by applying (e.g., multiplying in the time domain) the second LO frequency, F2. The processed RF output signal, Out1, may be equal to F2×[(In1*(gain of In1)−In2*(gain of In2))*(gain of Out1)]. The output paths for Out2-4 may be in isolation mode such that no signal is transmitted from the RF processor element 206A to output circuits 212-2, 212-3, and 212-4.

As a second example of RF translation, the RF processor element 206A may be configured to simultaneously output (e.g., route) a first processed translation RF output signal, Out1, to the output circuit 212-1 and a second processed translation RF output signal, Out2, to the output circuit 212-2 while switching the output paths for Out3-4 to be in isolation mode. Out1 is a translation of a mixed frequency signal (which is a superposition of the first and second RF channels) by applying the second LO frequency, F2. Out2 is a translation of a mixed frequency signal (which is a subtraction of the second RF channel from the first RF channel) by applying the second LO frequency, F2. The processed RF output signal, Out1, may be equal to F2×[(In1*(gain of In1)+In2*(gain of In2))*(gain of Out1)]. The processed RF output signal, Out2, may be equal to F2×[(In1*(gain of In1)−In2*(gain of In2))*(gain of Out2)]. The output paths for Out3-4 may be in isolation mode such that no signal is transmitted from the RF processor element 206A to output circuits 212-3 and 212-4.

As a third example of RF translation, the RF processor element 206A may be configured to simultaneously route four translation signals, each with equal gains and phases, to four different output circuits 212-1, 212-2, 212-3, 212-4. For example, Out1-4 are a translation of a mixed frequency signal (which is a subtraction of the second RF channel from the first RF channel) by applying the first LO frequency, F1. The processed RF output signals, Out1-4, may be equal to F1×[(In1*(gain of In1)−In2*(gain of In2))*(gain of Out)].

The RF processor element 206A may be configured to perform any suitable translation operations on any designated input signals (e.g., from any designated input circuits) and/or designated mixed frequency signals (e.g., a superposition and/or subtraction based on one or more designated input signals of designated input circuits) by applying any designated oscillator frequencies (e.g., a designated LO frequency or frequencies from a designated LO) and to output processed translation RF output signals to any designated output circuits.

Referring now to FIG. 4, an exemplary embodiment of a communication system 104 including an RF processor 200A according to the inventive concepts disclosed herein is shown. The communication system 104 may be implemented and function similarly to the communication system 104 of FIGS. 1-2 except that RF processor 200A may be substituted for the RF processor 200 of FIG. 2 or that the communication system 104 may further include the RF processor 200A. The RF processor 200A may be implemented and function similarly to the RF processor 200 of FIG. 2 except that the RF processor 200A includes two 2×2×4 RF processor elements 206A-1 and 206A-2, which are coupled to each other. Each of the RF processor elements 206A-1 and 206A-2 may be implemented and function similarly to the RF processor element 206A of FIG. 3. The RF processor 200A may be programmed such that each of the RF processor elements 206A-1 and 206A-2 may be programmed to function independent or dependent on one another. While FIG. 4 does not show all of the components that might be implemented within the communication system 104 and RF processor 200A, embodiments may include any suitable components, such as any suitable components utilized for receiving, processing, and/or transmitting signals.

In an exemplary embodiment, the RF processor 200A is configured for STAR such that the RF processor 200A is configured to simultaneously receive signals received by the ESA 106 and transmit signals to the ESA 106 for transmission by the ESA 106. Because the ESA 106 is transmitting transmit signals (e.g., outputted from the RF processor element 206A-2) at the same time that the ESA 106 is receiving receive signals (e.g., to be routed as an input signal, In1, to the RF processor element 206A-1), transmit signals routed to the ESA 106 from the RF processor element 206A-2 may interfere with receive signals received by the ESA 106 to be routed as an input signal, In1, on a receive path to the RF processor element 206A-1. To improve performance and functioning of the RF processor 200A's STAR functionality, the RF processor element 206A-1 is configured to cancel interference on receive signals caused by simultaneously transmitted transmit signals. The RF processor element 206A-1 is configured to cancel interference on receive signals by performing an RF subtraction of the transmit signals from the receive signals.

The RF processor element 206A-2 may be configured (e.g., programmed) to ignore or switch off a first input signal, In1. The RF processor element 206A-2 may be configured to utilize a second input signal, In2, which is a transmit signal, "TX Signal", (e.g., for transmission by the ESA 106 and from an input circuit 208). The RF processor element 206A-2 may be configured to perform an RF split operation on the input signal, In2 (i.e., the transmit signal), and output two processed RF output signals, Out1 and Out4, for transmission with same or different gains. The RF processor element 206A-2 may output (e.g., route) Out1 to the RF processor element 206A-1 such that the RF processor element 206A-1 may utilize Out1 for an RF subtraction operation to cancel interference. The processed RF output signal, Out1, may be equal to (0*In1+In2*(gain of Out1)), or simply, In2*(gain of Out1), according to designated output path functions. The RF processor element 206A-2 may output (e.g., route) Out4 to the ESA 106 for transmission by the ESA 106. The processed RF output signal, Out4, may be equal to (0*In1+In2*(gain of Out4)), or simply, In2*(gain of Out4), according to designated output path functions. The output paths for Out2-3 may be in isolation mode (e.g., Out2=0 and Out3=0) such that no signal is transmitted from the RF processor element 206A-2 along the output paths for Out2-3.

The RF processor element 206A-1 may be configured (e.g., programmed) to utilize a first input signal, In1, and a second input signal, In2, to improve STAR functioning of the RF processor 200A with respect to signals received from the ESA 106 during simultaneous transmit and receive operation of the ESA 106. The first input signal, In1, is received from the ESA 106 as an interfered receive signal. That is, the interfered receive signal of In1 includes both a desired receive signal and an interfering transmit signal, Out4, of RF processor element 206A-2. The second input signal, In2, is received by RF processor element 206A-1 from the RF processor element 206A-2 as Out1 (e.g., a signal having the same frequency as the interfering transmit signal, Out4, of RF processor element 206A-2).

The RF processor element 206A-1 may be configured to cancel out the interfering transmit signal, Out4, of RF processor element 206A-2 from the first input signal, In1, received from the ESA 106 by subtracting the second input signal, In2 (i.e., Out1 from the RF processor element 206A-2, which has the same frequency as the interfering transmit signal, Out4), from the first input signal, In1, received from the ESA 106. The processed RF output signal, Out1, of the RF processor element 206A-1 may be equal to (In1*(gain of In1)−In2*(gain of In2))*(gain of Out1) according to designated output path functions. The output paths for Out2-4 may be in isolation mode (e.g., Out2=0, Out3=0, and Out4=0) such that no signal is transmitted from the RF processor element 206A-1 along the output paths for Out2-4. By subtracting the second input signal, In2, from the first input signal, In1, the RF processor element 206A-1 cancels out the interfering transmit signal so as to output the desired receive signal (e.g., as received by the ESA 106). The RF processor element 206A-1 is configured to output the processed RF output signal to any designated output circuit (e.g., of output circuits 212). For example, the RF processor 200A may include at least one phase control element (e.g., phase shifter 402 or time delay element (e.g., true-time delay element)) configured to align phases of a) the output signal, Out1, from the RF processor element 206A-2 used as the input signal, In2, by the RF processor element 206A-2 and b) the receive signal from the ESA 106 used as the input signal, In1, by the RF processor element 206A-2. Further, for example, the RF processor element 206A-1 may be configured to: a) receive input signals, In1 and In2, with precisely aligned phase (e.g., within 0.5 degrees as may be aligned by the phase shifter 402 adjusting the phase of In2), b) to precisely align the amplitude (e.g., within 0.1 dB) of In1 and In2, and c) to at least substantially cancel out the interfering transmit signal, such as by cancelling out greater than 50 dB of the interfering transmit signal. While the RF processor 200A is shown as including a phase control element (e.g., the phase shifter 402) in FIG. 4, in some embodiments the RF processor 200A may omit the phase control element (e.g., the phase shifter 402), and, for example, each of the RF processor elements 206A-1 and 206A-2 may be configured to align phase of two signals precisely.

While not shown in FIG. 4, the RF processor 200A, the communication system 104, and/or the ESA 106 may include additional elements. For example, the RF processor 200A may optionally include at least one amplifier (e.g., variable gain amplifier (VGA), low noise amplifier (LNA), or power amplifier (PA)) configured to align amplitude of a) the output signal, Out1, from the RF processor element 206A-2 used as the input signal, In2, by the RF processor element 206A-2 and b) the receive signal from the ESA 106 used as the input signal, In1, by the RF processor element 206A-2; however, in some embodiments, the at least one amplifier may be omitted, and the RF processor elements 206A-1 and 206A-2 may be configured to align amplitude precisely. Additionally, for example, the RF processor 200A may include a circulator, diplexer, and/or duplexer at the junction of the ESA 106's receive signal, the ESA 106's transmit signal, the output signal Out4 from the RF processor element 206A-2, and the input signal In1 to the RF processor element 206A-1. In such embodiments that include a circulator, diplexer, and/or duplexer, the RF processor element 206A-1 may be configured to cancel out any reflected leakage and/or parasitic leakage of the output signal Out4, which may leak into the input signal In1 and interfere with the desired receive signal from the ESA 106.

While the RF processor 200A is exemplarily shown as including two RF processor elements 206A-1 and 206A-2, some embodiments may include any number of RF processor elements (e.g., 206, 206A, 206A-1, and/or 206A-2), which may be implemented in or as any number of RF processors (e.g., 200 (as shown in FIG. 2) and/or 200A (as shown in FIG. 4)). While the RF processor 200A has been exemplarily described and depicted as cancelling out an interfering transmit signal so as to output a desired receive signal to improve STAR functioning of the RF processor 200A, itself, some embodiments may include an RF processor implemented with any suitable number, type, and arrangement of RF processor elements (e.g., 206, 206A, 206A-1, and/or 206A-2) to perform any desired RF operation or combination of RF operations. Additionally, while the ESA 106 is exemplarily shown as a single ESA, some embodiments may include multiple ESA elements or multiple antennas; for example, the ESA 106 may be implemented as two ESA elements, a transmit ESA element and a receive ESA element, such that Out4 from the RF processor element 206A-2 is output to the transmit ESA element for RF transmission and such that the receive ESA element receives an RF signal, which is output as input signal, In1, to the RF processor element 206A-1.

Further, while RF processors (e.g., 200 and 200A) and RF processor elements (e.g., 206, 206A, 206A-1, and 206A-2) have been exemplarily described with respect to FIGS. 1-4 as being implemented within a communication system 104, in some embodiments, RF processors and/or RF processor elements according to the inventive concepts disclosed herein may be implemented in any suitable system or device or used for any suitable application.

Figure 5A:
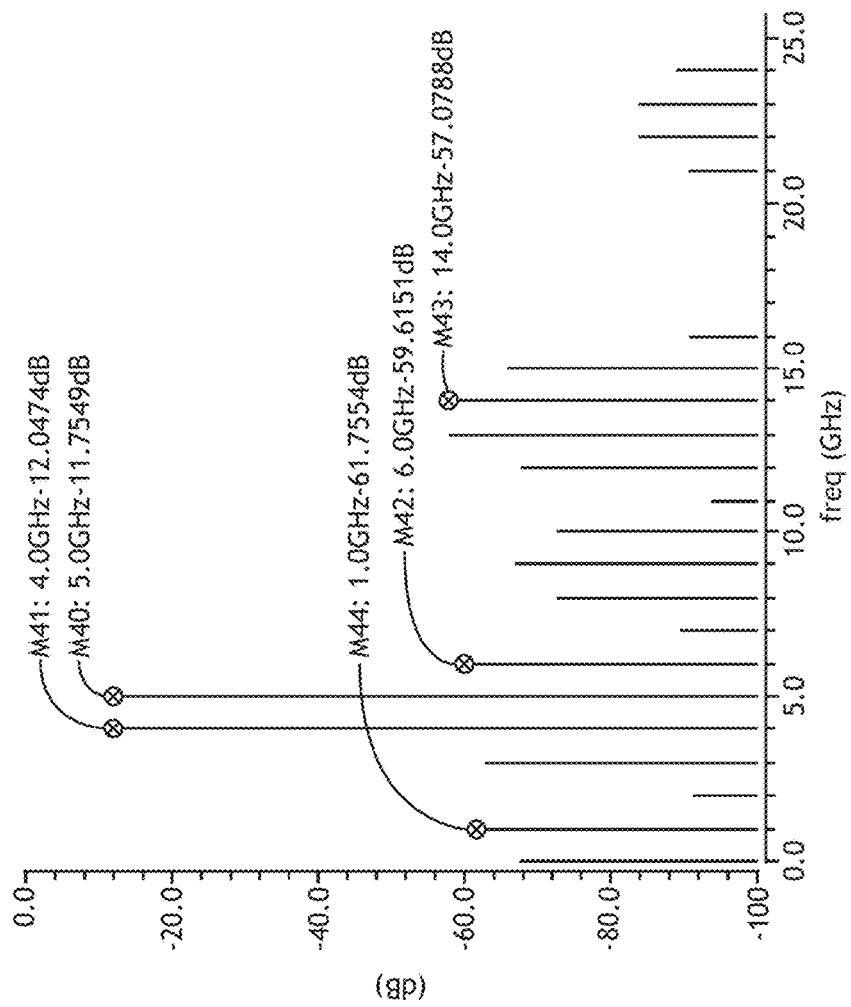
FIG. 5A is a graph that plots signal level in dB against frequency for an RF processor channel's output signal, which includes both a desired 5.0 GHz received signal and an interfering 4.0 GHz signal, without active cancellation.

Referring now to FIGS. 5A-5B, graphs show exemplary effects of interference on an antenna device (e.g., ESA 106) when the antenna device simultaneously transmits a 4.0 gigahertz (GHz) signal and receives a 5.0 GHz signal without cancelling out the 4.0 GHz transmit signal from a receive channel. FIG. 5A shows a graph that plots signal strength (dB) against frequency (GHz) for an RF processor channel's output signal, which includes both the desired 5.0 GHz receive signal and the interfering 4.0 GHz transmit signal that are present on the input. FIG. 5B shows a time domain graph of a waveform from FIG. 5A as a plot of voltage (millivolts (mV)) against time (nanoseconds (ns)). As is apparent from FIG. 5B, the waveform of the RF processor output signal, which includes both the desired 5.0 GHz receive signal and the interfering 4.0 GHz transmit signal, is less desirable for performing RF signal processing as compared to the desired 5.0 GHz waveform depicted in FIG. 6B.

Figure 6A:
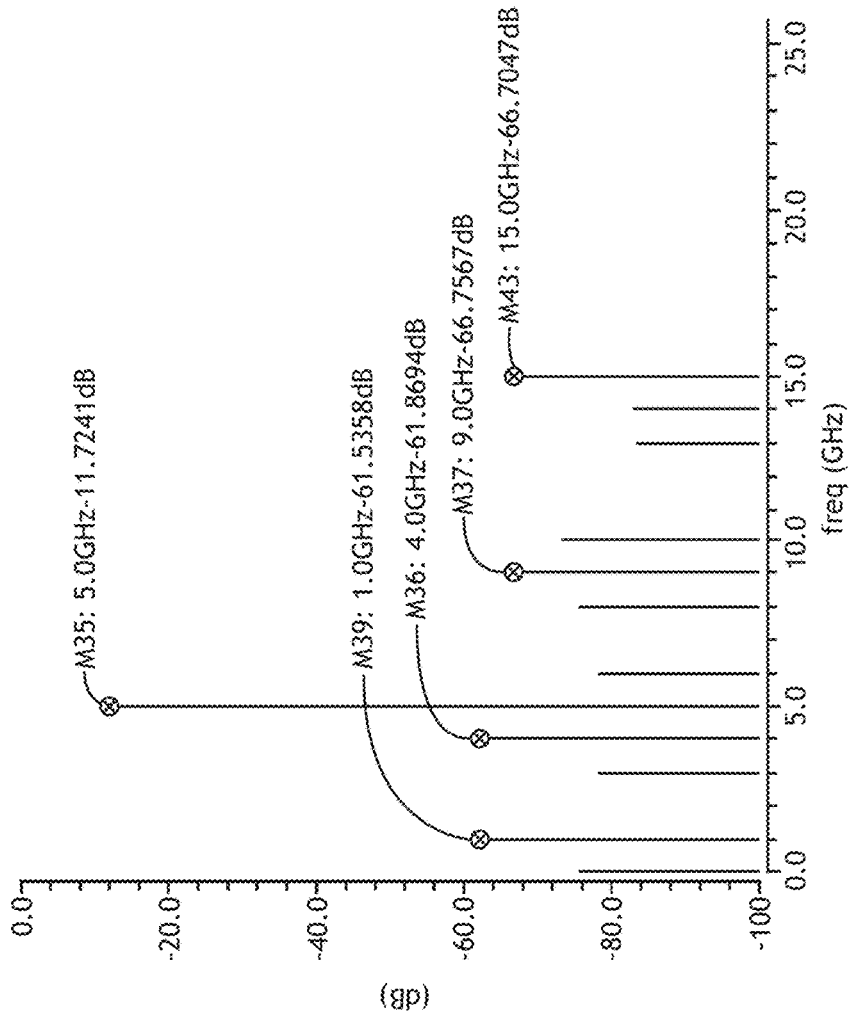
FIG. 6A is a graph that plots signal level in dB against frequency for a processed RF output signal with the same signals from FIGS. 5A and 5B, but utilizing active cancellation to remove the interfering 4 GHz signal.
Figure 6B:
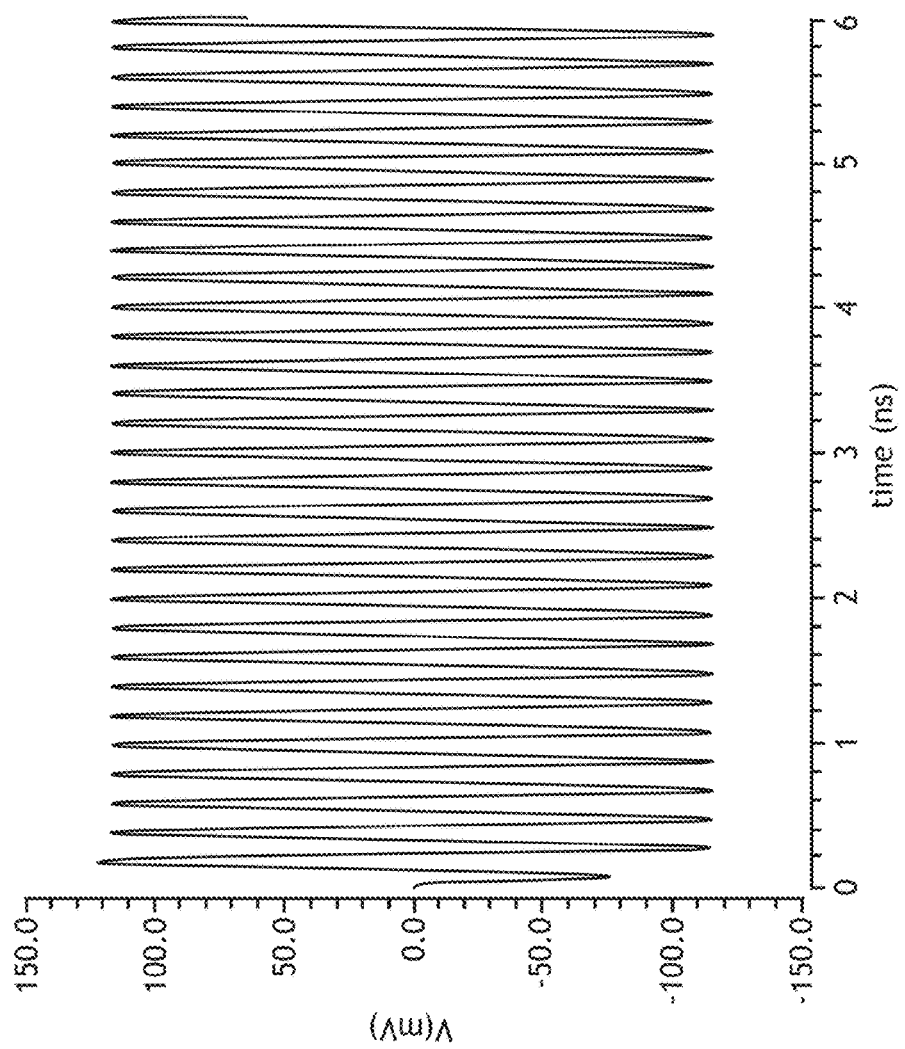
FIG. 6B is a time domain graph of a waveform of the processed RF output signal depicted in FIG. 6A as a plot of voltage against time from FIG. 6A where active cancellation is used to remove the interfering 4 GHz signal.

Referring now to FIGS. 6A-6B, graphs show effects of active cancellation by the RF processor 200A of FIG. 4 on interference to an antenna device (e.g., ESA 106) when the antenna device simultaneously transmits a 4.0 gigahertz (GHz) signal and receives a 5.0 GHz signal with active cancellation of the 4.0 GHz transmit signal according to the inventive concepts disclosed herein. FIGS. 6A-6B demonstrate an improvement to the functioning of the RF processor 200A, itself, by cancelling out interference on the RF processor 200A's processed RF output signal, Out1, from the RF processor element 206A-1. FIG. 6A shows a graph that plots signal level (dB) against frequency (GHz) for the processed RF output signal, Out1, of the RF processor element 206A-1 of the RF processor 200A of FIG. 4. FIG. 6B shows a time domain graph of a waveform of the processed RF output signal, Out1, of the RF processor element 206A-1 of the RF processor 200A of FIG. 4 as a plot of voltage (mV) against time (ns). As is apparent from a comparison of FIG. 6B against FIG. 5B, the waveform of the processed RF output signal, Out1, of the RF processor element 206A-1 has less distortion than the waveform depicted in FIG. 5B.

Figure 7:
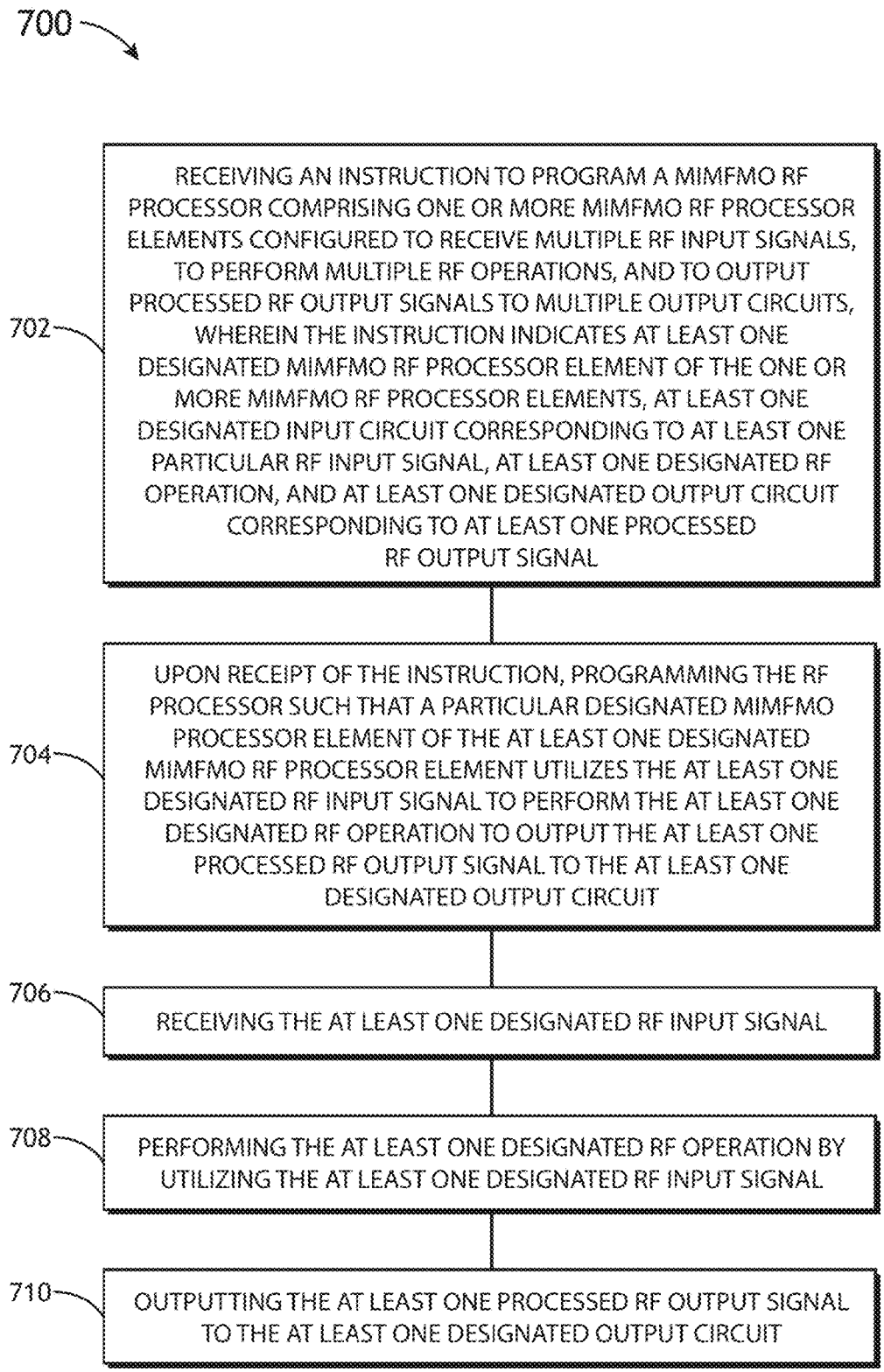
FIG. 7 is a diagram of an exemplary embodiment of a method of operating a MIMFMO RF processor according to the inventive concepts disclosed herein.

Referring now to FIG. 7, an exemplary embodiment of a method 700 of operating a MIMFMO RF processor according to the inventive concepts disclosed herein may include one or more of the following steps A step 702 may include receiving an instruction to program a MIMFMO RF processor comprising one or more MIMFMO RF processor elements configured to receive multiple RF input signals, to perform multiple RF operations, and to output processed RF output signals to multiple output circuits, wherein the instruction indicates at least one designated MIMFMO RF processor element of the one or more MIMFMO RF processor elements, at least one designated input circuit corresponding to at least one particular RF input signal, at least one designated RF operation, and at least one designated output circuit corresponding to at least one processed RF output signal.

A step 704 may include, upon receipt of the instruction, programming the MIMFMO RF processor such that a particular designated MIMFMO RF processor element of the at least one designated MIMFMO RF processor element utilizes the at least one designated RF input signal to perform the at least one designated RF operation to output the at least one processed RF output signal to the at least one designated output circuit.

A step 706 may include receiving the at least one designated RF input signal.

A step 708 may include performing the at least one designated RF operation by utilizing the at least one designated RF input signal.

A step 710 may include outputting the at least one processed RF output signal to the at least one designated output circuit.

Further, the method 700 may include any of the operations disclosed throughout.

As will be appreciated from the above, embodiments of the inventive concepts disclosed herein may include at least one programmable MIMFMO RF processor (e.g., RF processor 200, RF processor 200A, and/or combinations thereof) and/or at least one MIMFMO RF processor element (e.g., RF processor element 206, RF processor element 206A, RF processor element 206A-1, RF processor element 206A-2, and/or combinations thereof), as well as systems and devices including at least one programmable MIMFMO RF processor and/or at least one MIMFMO RF processor element. Further, as will be appreciated from the above, embodiments of the inventive concepts disclosed herein may include methods of operating at least one programmable MIMFMO RF processor (e.g., RF processor 200, RF processor 200A, and/or combinations thereof) and/or at least one MIMFMO RF processor element (e.g., RF processor element 206, RF processor element 206A, RF processor element 206A-1, RF processor element 206A-2, and/or combinations thereof), as well as methods of operating systems and devices including at least one such programmable MIMFMO RF processor and/or at least one MIMFMO RF processor element.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A multiple input, multiple function, multiple output (MIMFMO) radiofrequency (RF) processor, comprising:
   a first MIMFMO RF processor element configured to:
      receive multiple RF input signals;
      perform multiple RF operations on the multiple RF input signals; and
      output processed RF output signals to multiple output circuits; and
   a second MIMFMO RF processor element communicatively coupled to the first MIMFMO RF processor element, wherein the second MIMFMO RF processor element is configured to output at least one processed RF output signal as at least one of the multiple RF input signals configured to be received by the first MIMFMO RF processor element,
   wherein the first MIMFMO RF processor element is further configured to subtract the at least one processed RF output signal received from the second MIMFMO RF processor element from another of the multiple RF input signals received by the first MIMFMO RF processor element, wherein the MIMFO RF processor is configured for simultaneous transmit and receive (STAR) operation.

2. The processor of claim 1, wherein the MIMFMO RF processor is programmed such that the first MIMFMO RF processor element utilizes at least one designated RF input signal of the multiple RF input signals to perform at least one designated RF operation of the multiple RF operations to output at least one processed RF output signal to at least one designated output circuit of the multiple output circuits.

3. The processor of claim 2, wherein the MIMFMO RF processor is configured to be reprogrammed to change one or more of the at least one designated RF input signal, the at least one designated RF operation, or the at least one designated output circuit.

4. The processor of claim 1, further comprising:
a programming interface communicatively coupled to the first MIMFMO RF processor element, the programming interface configured to receive an instruction to program the MIMFMO RF processor such that the first MIMFMO RF processor element utilizes at least one designated RF input signal of the multiple RF input signals to perform at least one designated RF operation of the multiple RF operations to output at least one processed RF output signal to at least one designated output circuit of the multiple output circuits.

5. The processor of claim 4, further comprising:
digital-to-analog converters coupled to the programming interface and the first MIMFMO RF processor element.

6. The processor of claim 1, wherein the multiple RF operations comprise one or more RF mathematical operations comprising at least one of an RF addition, an RF subtraction, or an RF translation.

7. A system, comprising:
multiple input circuits;
multiple output circuits; and
a multiple input, multiple function, multiple output (MIMFMO) radiofrequency (RF) processor, wherein the MIMFO RF processor is configured for simultaneous transmit and receive (STAR) operation, the MIMFMO RF processor being coupled to the input circuits and the output circuits, the MIMFMO RF processor comprising:
a first MIMFMO RF processor element configured to:
receive multiple RF input signals;
perform multiple RF operations on the multiple RF input signals; and
output processed RF output signals to the multiple output circuits; and
a second MIMFMO RF processor element communicatively coupled to the first MIMFMO RF processor element, the second MIMFMO RF processor element configured to output at least one processed RF output signal as at least one of the multiple RF input signals configured to be received by the first MIMFMO RF processor element,
wherein the first MIMFMO RF processor element is further configured to subtract the at least one processed RF output signal received from the second MIMFMO RF processor element from another of the multiple RF input signals received by the first MIMFMO RF processor element.

8. The system of claim 7, wherein at least one of the multiple output circuits is implemented in, on, or as a portion of an antenna device.

9. The system of claim 7, wherein at least one of the multiple input circuits is implemented in, on, or as a portion of an antenna device.

10. The system of claim 7, wherein the MIMFMO RF processor is programmed such that the first MIMFMO RF processor element utilizes at least one designated RF input signal of the multiple RF input signals to perform at least one designated RF operation of the multiple RF operations to output at least one processed RF output signal to at least one designated output circuit of the multiple output circuits.

11. The system of claim 10, wherein the MIMFMO RF processor is configured to be reprogrammed to change one or more of the at least one designated RF input signal, the at least one designated RF operation, or the at least one designated output circuit.

12. The system of claim 7, wherein the MIMFMO RF processor further comprises:
a programming interface communicatively coupled to the first MIMFMO RF processor element, the programming interface configured to receive an instruction to program the MIMFMO RF processor such that the first MIMFMO RF processor element utilizes at least one designated RF input signal of the multiple RF input signals to perform at least one designated RF operation of the multiple RF operations to output at least one processed RF output signal to at least one designated output circuit of the multiple output circuits.

13. The processor of claim 12, wherein the MIMFMO RF processor further comprises:
digital-to-analog converters coupled to the programming interface and the first MIMFMO RF processor element.

14. A method for operating a multiple input, multiple function, multiple output (MIMFMO) radiofrequency (RF) processor, comprising:
receiving an instruction to program a MIMFMO RF processor comprising MIMFMO RF processor elements each configured to receive multiple RF input signals, to perform multiple RF operations, and to output processed RF output signals to multiple output circuits, the MIMFMO RF processor elements comprising a first MIMFMO RF processor element and a second MIMFMO RF processor element, the second MIMFMO RF processor element communicatively coupled to the first MIMFMO RF processor element, wherein the instruction indicates at least one designated MIMFMO RF processor element of the MIMFMO RF processor elements, at least one designated input circuit corresponding to at least one particular RF input signal, at least one designated RF operation, and at least one designated output circuit corresponding to at least one processed RF output signal; and
upon receipt of the instruction, programming the MIMFMO RF processor such that a particular designated MIMFMO RF processor element of the at least one designated MIMFMO RF processor element utilizes the at least one designated RF input signal to perform the at least one designated RF operation to output the at least one processed RF output signal to the at least one designated output circuit, wherein programming the MIMFMO RF processor further configures the second MIMFMO RF processor element to output at least one processed RF output signal as at least one of the multiple RF input signals configured to be received by the first MIMFMO RF processor element, wherein programming the MIMFMO RF processor further configures the first MIMFMO RF processor element to subtract the at least one processed RF output signal received from the second MIMFMO RF processor element from another of the multiple RF input signals received by the first MIMFMO RF processor element, wherein the MIMFO RF processor is configured for simultaneous transmit and receive (STAR) operation.

15. The method of claim 14, further comprising:

receiving the at least one designated RF input signal;

performing the at least one designated RF operation by utilizing the at least one designated RF input signal; and outputting the at least one processed RF output signal to the at least one designated output circuit.

* * * * *